A. M. LE PIERRE.
WRENCH.
APPLICATION FILED AUG. 27, 1917.
1,286,668.
Patented Dec. 3, 1918.
2 SHEETS—SHEET 2.
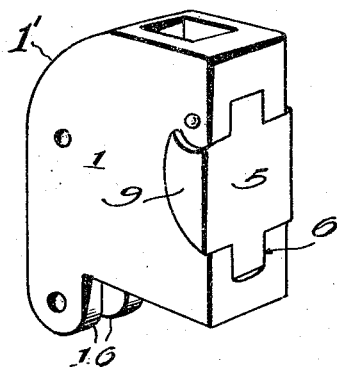
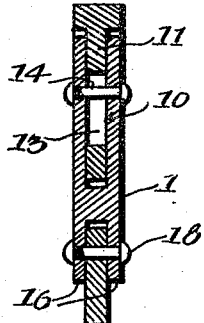
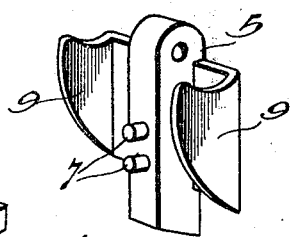
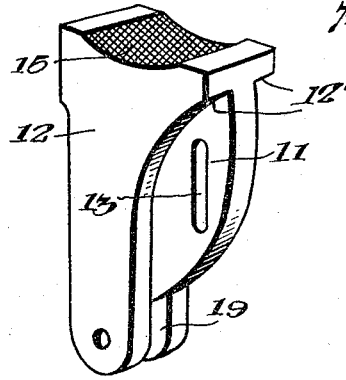
Inventor
Auguste M. Le Pierre
Witness
H. Woodard
By H. R. Wilson &co
Attorneys

UNITED STATES PATENT OFFICE.

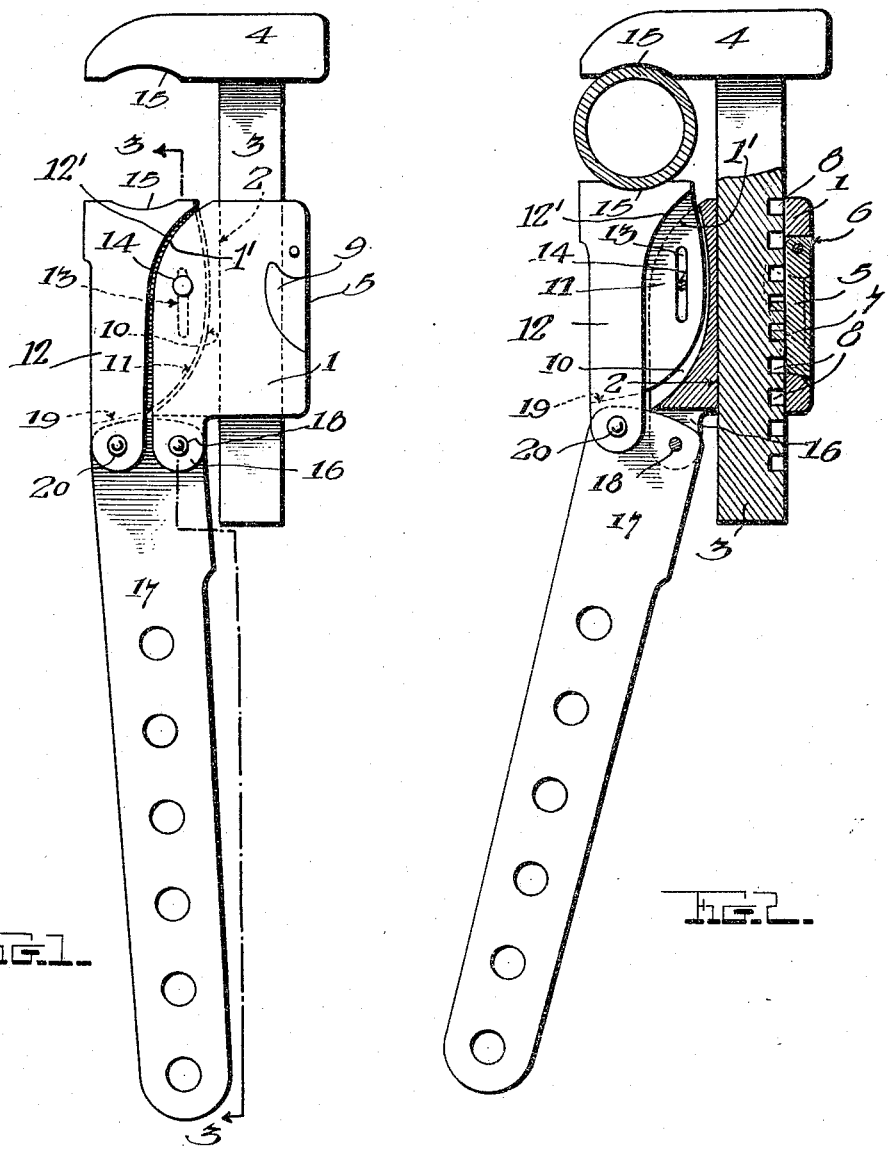

AUGUSTE MARIE LE PIERRE, OF KORBEL, CALIFORNIA.

WRENCH.

1,286,668. Specification of Letters Patent. Patented Dec. 3, 1918.

Application filed August 27, 1917. Serial No. 188,418.

*To all whom it may concern:*

Be it known that I, AUGUSTE M. LE PIERRE, a citizen of the United States, residing at Korbel, in the county of Humboldt and State of California, have invented certain new and useful Improvements in Wrenches; and I do declare the following to be a full, clear, and exact description of the invention, such as will enable others skilled in the art to which it appertains to make and use the same.

My invention has for its object to provide a comparatively simple and inexpensive, yet a highly efficient and durable wrench so constructed as to forcibly grip the object to be turned.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a side elevation of the improved wrench in normal position;

Fig. 2 is a similar view showing the tool in use, parts being broken away and in section;

Fig. 3 is a vertical section on the plane of the line 3—3 of Fig. 1;

Fig. 4 is a perspective view of the carrier block;

Fig. 5 is a similar view of the sliding jaw; and

Fig. 6 is a perspective view of the locking dog of the other jaw.

In the drawings above briefly described, the numeral 1 designates a flat substantially rectangular carrier block, said block having a longitudinal opening 2 formed therethrough to slidably receive a shank 3 which extends rearwardly from one of the jaws 4 of the wrench, any suitable means being provided for holding the shank in adjusted position. Preferably employed for this purpose, however, is a pivoted dog 5 which is carried by the block 1 to swing into a recess 6 in the rear end thereof, the inner side of said dog having one or more teeth 7 for reception in longitudinally spaced sockets 8 formed in the shank 3. Although the dog 5 is by preference carried by the rear edge of the carrier block 1, it will be obvious that it could well be mounted on one side thereof, and that if this arrangement were employed, the location of the openings 8 would necessarily be varied. When the dog 5 is positioned as shown in the drawings, the sides thereof will preferably be provided with a pair of wings 9, which contact with the outer sides of the block 1 as shown more clearly in Fig. 4.

The front edge of the carrier block 1 is provided with a vertically disposed channel 10 in which a vertical web 11 on the rear edge of a second and sliding jaw 12 is received, said web having a longitudinal slot 13 receiving a pin 14 which passes through the block 1. The coacting faces of the jaws 4 and 12 may be of any suitable design, but they are preferably provided with depressions 15 extending transversely thereof to receive a pipe therein, the bottoms of said depressions being serrated in any preferred manner. The remainder of the jaw faces is preferably smooth so that nuts may be gripped therebetween to permit the wrench to be used both as a monkey wrench and a pipe wrench. Due to the depressions 15, the danger of crushing delicate pipes is reduced to the minimum although an effective grip is maintained upon said pipes.

A pair of ears 16 extend rearwardly from the carrier block 1, on opposite sides of its channel 10, and one front corner of a handle 17 is pivoted at 18 between said ears, the other front corner of said handle being received in a notch 19 in the rear end of the jaw 12 and pivoted to said jaw by a transverse pin 20. By this arrangement of pivots, the handle 17 becomes in effect a lever for sliding the jaw 12 toward and away from the jaw 4, as the handle is oscillated during the operation of the tool. It will be observed that when a power stroke is taking place, the jaw 12 will be moved toward the jaw 4 so that the article being turned will be effectively gripped. When, however, the return stroke is taking place, the jaw 12 will be moved away from the jaw 4 so that the wrench may readily turn upon the work for a new grip. The rearward movement of the jaw 12 is limited by contact of the outwardly curved posterior edge 12' thereof with the inwardly curved anterior edge 1' of the slide 1, and hence there is no danger of the front end wall of slot 13 shearing the pin 14.

From the foregoing, taken in connection with the accompanying drawings, it will be obvious that although the improved wrench is comparatively simple and inexpensive, it will be highly efficient and durable. Since probably the best results are obtained from the specific features of construction shown and described, such features constitute the preferred form of the tool. I wish it understood, however, that within the scope of the invention as claimed, numerous minor changes may well be made without sacrificing the principal advantages.

I claim:

A wrench comprising a slide of substantially flat formation, the posterior edge portion of said slide having a longitudinal guide opening, the anterior edge of said slide curving inwardly at its front end and having a longitudinal groove opening through said front end and through said edge, a solid substantially flat jaw equaling said slide in thickness and having its posterior edge turned outwardly to strike the curve of said anterior edge of said slide, to limit the rearward movement of said jaw, an integral flat web on said posterior edge of said jaw received slidably in said groove and having a longitudinal slot, a pin passing through said slide and slot, a pair of ears on the rear end of each of said jaw and slide, a longitudinal handle received between and pivoted at laterally spaced points to said ears, whereby oscillation of said handle will move said jaw forwardly and rearwardly, an additional jaw having a longitudinal shank received slidably in said guide opening, and means for holding said shank in adjusted position.

In testimony whereof I have hereunto set my hand in the presence of two subscribing witnesses.

AUGUSTE MARIE LE PIERRE.

Witnesses:
SADIE A. PATENAUDE,
MANUEL MENDES.

Copies of this patent may be obtained for five cents each, by addressing the "Commissioner of Patents, Washington, D. C."